United States Patent
Terazawa et al.

(10) Patent No.: US 9,573,593 B2
(45) Date of Patent: Feb. 21, 2017

(54) LANE DEVIATION PREVENTION CONTROL APPARATUS OF VEHICLE

(71) Applicant: FUJI JUKOGYO KABUSHIKI KAISHA, Tokyo (JP)

(72) Inventors: Takeshi Terazawa, Tokyo (JP); Takeshi Tamaki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 14/666,014

(22) Filed: Mar. 23, 2015

(65) Prior Publication Data
US 2015/0274164 A1    Oct. 1, 2015

(30) Foreign Application Priority Data
Mar. 28, 2014  (JP) ................. 2014-069710

(51) Int. Cl.
*B60W 30/12*    (2006.01)
*B62D 15/02*    (2006.01)

(52) U.S. Cl.
CPC ............ *B60W 30/12* (2013.01); *B62D 15/025* (2013.01)

(58) Field of Classification Search
CPC ............ G08G 1/09; G08G 1/16; G08G 1/163; G08G 1/165; G08G 1/166; G08G 1/167; G08G 9/02; B62D 6/00; B62D 6/003; B62D 6/008; B62D 15/025; B62D 15/029; B62D 1/28; B62D 1/046; B60W 10/20; B60W 30/095; B60W 30/12; B60W 2550/146
See application file for complete search history.

(56) References Cited

FOREIGN PATENT DOCUMENTS

| JP | 07-105498 A |   | 4/1995 |
|----|-------------|---|--------|
| JP | 2004-243783 A |   | 9/2004 |
| JP | 2004243783 A | * | 9/2004 |
| JP | 2008-195402 A |   | 8/2008 |
| JP | 2008-207805 A |   | 9/2008 |
| JP | 2008207805 A | * | 9/2008 |
| JP | 2010-030387 A |   | 2/2010 |
| JP | 2010030387 A | * | 2/2010 |

* cited by examiner

*Primary Examiner* — Jerrah Edwards
*Assistant Examiner* — Charles J Han
(74) *Attorney, Agent, or Firm* — McDermott Will & Emery LLP

(57) ABSTRACT

A lane deviation prevention control apparatus of a vehicle calculates a lane width direction vehicle lateral position and a yaw angle of the vehicle with respect to a lane, calculates, on the basis of the lane width direction vehicle lateral position, the yaw angle, and vehicle speed, a lane deviation predicted time in which the vehicle deviates from the lane, calculates, on the basis of the yaw angle and the lane deviation predicted time, a target yaw moment applied to the vehicle for preventing deviation from the lane, observes a change rate of the target yaw moment, and, when the change rate of the target yaw moment is equal to or larger than a threshold set in advance, limits the change rate of the target yaw moment to be equal to or smaller than a change rate limit value variably set according to at least traveling road information.

15 Claims, 10 Drawing Sheets

LANE DEVIATION PREVENTION CONTROL APPARATUS OF VEHICLE

CROSS-REFERENCE TO RELATED APPLICATION

The present application claims priority from Japanese Patent Application No. 2014-069710 filed on Mar. 28, 2014, the entire contents of which are hereby incorporated by reference.

BACKGROUND

1. Technical Field

The present invention relates to a lane deviation prevention control apparatus of a vehicle that, when the vehicle is about to deviate from the traveling lane, actuates an actuator to thereby apply a yaw moment to the vehicle to prevent deviation from a lane.

2. Related Art

In recent years, various devices for supporting driving have been developed and put to practical use for vehicles. A lane deviation prevention control apparatus that prevents deviation from a lane is one of such devices. For instance, Japanese Unexamined Patent Application Publication (JP-A) No. H7-105498 discloses a technique of a traveling state determining device of an automobile that predicts a deviation state from a lane on the basis of a distance to a point of intersection of an estimated traveling path of a vehicle and a side edge of a line and on the basis of an angle formed by the estimated traveling path and the side edge at the point of intersection and performs automatic steering correction in order to prevent deviation on the basis of the prediction. JP-A No. 2008-195402 discloses a technique of a driving support device that, when a lane deviation determining unit determines that a traveling vehicle will deviate from a lane, applies warning torque to the vehicle and prevents lane deviation. The driving support device sets, on the basis of a maximum of the warning torque applied to the vehicle, a change rate of the warning torque to the maximum of the warning torque such that time until the warning torque reaches the maximum is fixed.

In the technique of the traveling state determining device disclosed in JP-A No. H7-105498, when a value of a change rate of a target turning amount applied to the vehicle in order to prevent vehicle deviation is a fixed value and a set target turning amount is abruptly output, a steering system and vehicle behavior suddenly fluctuate and give a sense of discomfort to a driver. Therefore, in JP-A No. 2008-195402, the change rate of the warning torque (the target turning amount) to be generated is changed to prevent the vehicle behavior felt by the driver from being increasing. However, only with the change of the change rate of the target turning amount, it is likely that not only suppression of vehicle behavior fluctuation but also deviation prevention for the vehicle is made difficult by being affected by change rate suppression, for instance, during deviation to an outer (inner) side of the curve or during deviation due to disturbance action.

SUMMARY OF THE INVENTION

The present invention has been devised in view of the above circumstances and it is an object of the present invention to provide a lane deviation prevention control apparatus of a vehicle that can suppress fluctuation in vehicle behavior caused by lane deviation control and reliably prevent deviation from a lane without giving a sense of discomfort to a driver.

An aspect of the present invention provides a lane deviation prevention control apparatus of a vehicle including: a lane detector that detects a lane in which the vehicle is traveling; a deviation predictor that predicts deviation from the lane on the basis of position information and a traveling state of the vehicle in the lane; a target turning amount calculator that calculates, on the basis of the prediction of deviation from the lane, a target turning amount to be applied to the vehicle, which is necessary for preventing the deviation from the lane; a target yaw moment calculator that generates a yaw moment in the vehicle to follow the target turning amount; and a target turning amount change rate limiter that observes a change rate of the target yaw moment, limits, when the change rate of the target yaw moment exceeds a threshold set in advance, a change rate of the target turning amount with at least a change rate limiting value variably set according to lane information, and outputs the change rate.

BRIEF DESCRIPTION OF THE DRAWINGS

FIG. 6A illustrates an instance of a characteristic in the case of deviation to an outer side of the curve; and FIG. 6B illustrates an instance of a characteristic in the case of deviation to an inner side of the curve;

FIG. 7A illustrates an instance of a characteristic in the case of deviation of the vehicle in a descending direction of the cant; and FIG. 7B illustrates an instance of a characteristic in the case of deviation of the vehicle in an ascending direction of the cant;

DETAILED DESCRIPTION

An example of the present invention is described with reference to the drawings.

Figure 1:
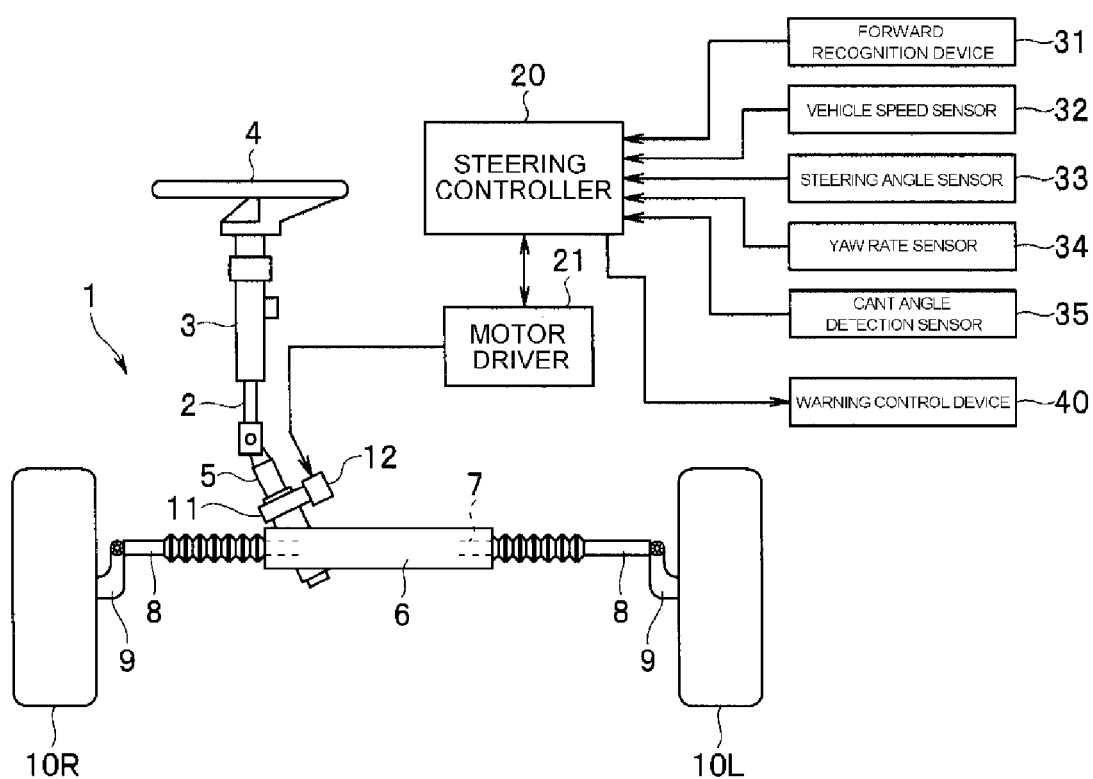
FIG. 1 is a configuration explanatory diagram of a steering system of a vehicle according to an example of the present invention.

In FIG. 1, reference numeral 1 denotes an electric power steering device that can freely set a steering angle independently from a driver input. In the electric power steering device 1, a steering shaft 2 is turnably supported by a not-illustrated vehicle body frame via steering column 3. One end of the steering shaft 2 is extended towards a driver's seat and the other end is extended towards an engine room. A steering wheel 4 is fixed to the driver's seat side end of the steering shaft 2. A pinion shaft 5 is connected to the end extended towards the engine room.

In the engine room, a steering gear box 6 extending to the vehicle width direction is disposed. A rack shaft 7 is inserted through and supported by the steering gear box 6 to be capable of reciprocatingly moving. A pinion formed in the pinion shaft 5 is meshed with a rack (not illustrated in the figure) formed in the rack shaft 7 to form a steering gear mechanism of a rack-and-pinion type.

Left and right ends of the rack shaft 7 are respectively projected from ends of the steering gear box 6. Front knuckles 9 are connected to the ends via tie rods 8. The front knuckles 9 turnably support left and right wheels 10L and 10R functioning as steered wheels and are steerably supported by the vehicle body frame. Therefore, when the steering wheel 4 is operated to rotate the steering shaft 2 and the pinion shaft 5, the rack shaft 7 moves in the left right direction according to the rotation of the pinion shaft 5. The front knuckles 9 turn about king pin shafts (not illustrated in the figure) according to the movement. The left and right wheels 10L and 10R are steered in the left and right direction.

An electric power steering motor (an electric motor) 12 is connected to the pinion shaft 5 via an assist transmission mechanism 11. The electric motor 12 assists steering torque applied to the steering wheel 4 and adds steering torque for obtaining a set target turning amount (a target yaw rate, for example). A target torque Tp serving as a control output value is output to a motor driver 21 from a steering controller 20. The electric motor 12 is driven by the motor driver 21.

The steering controller 20 has an electric power steering control function for assisting a steering force of a driver, a lane keep control function for causing a vehicle to travel along a target traveling path, a lane deviation prevention control function for preventing deviation of the vehicle from line marking lines (left and right lane lines), and the like. In this example, the configuration of the lane deviation prevention control function is described.

A forward recognition device 31 functioning as a lane detector that detects the lane marking lines (the left and right lane lines) and acquires lane information and posture angle/position information of the vehicle with respect to the lane is connected to the steering controller 20. A vehicle speed sensor 32 that detects vehicle speed V, a steering angle sensor 33 that detects a steering angle (a steer angle) $\theta p$, a yaw rate sensor 34 that detects a yaw rate $\gamma$, and a cant angle detection sensor 35 that detects a cant angle $\theta ca$ of the lane are connected to the steering controller 20.

The forward recognition device 31 is attached to, for instance, the front of the ceiling in the interior. The forward recognition device 31 includes a pair of CCD cameras that performs stereo image pickup of a target on the outside from different viewpoints and a stereo image processing device that processes image data from the pair of CCD cameras.

The processing of the image data from the pair of CCD cameras in the stereo image processing device of the forward recognition device 31 is performed, for instance, as described below. First, the stereo image processing device calculates, with respect to a pair of stereo images in a traveling direction of the vehicle picked up by the pair of CCD cameras, distance information from deviation of positions corresponding to the pair of stereo images and generates a distance image.

Figure 4:
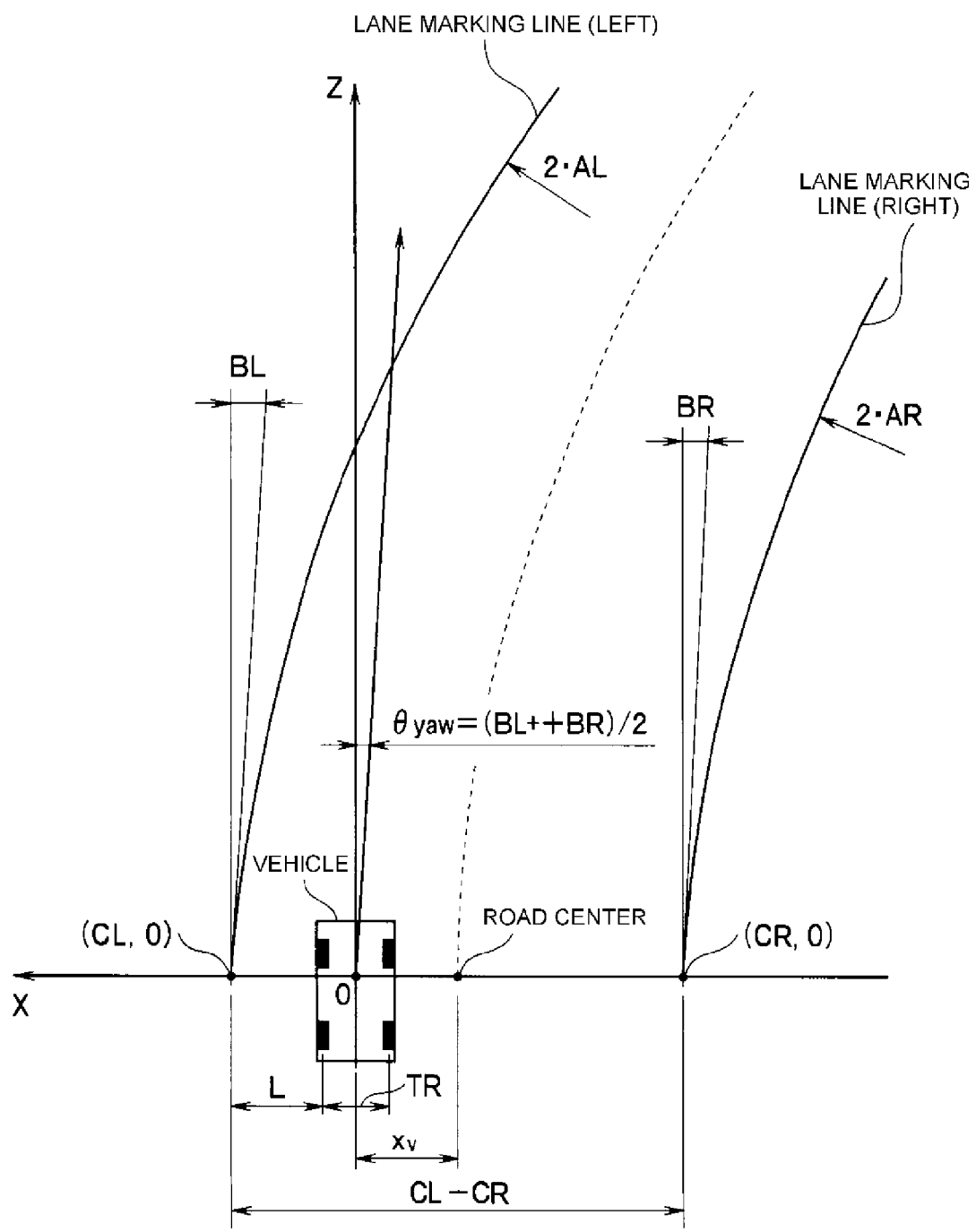
FIG. 4 is an explanatory diagram of a vehicle and a lane on an X-Z coordinate and parameters according to the example of the present invention.

In recognition of lane line data, a luminance change in the width direction of a road is evaluated on the basis of knowledge that a lane line has high luminance compared with a road surface. The positions of left and right lane lines on an image plane are specified on the image plane. Positions (x, y, z) on an actual space of the lane lines are calculated by a well-known coordinate conversion formula on the basis of positions (i, j) on the image plane and a parallax calculated concerning the positions, that is, on the basis of the distance information. In a coordinate system of the actual space set with reference to the position of the vehicle, in this example, for instance, as illustrated in FIG. 4, a road surface right below the center of a stereo camera is set as the origin, the vehicle width direction is set as the X axis (positive in the left direction), the vehicle height direction is set as the Y axis (positive in the up direction), and the vehicle length direction (the distance direction) is set as the Z axis (positive in the front direction). In this case, when the road is flat, an X-Z plane (Y=0) coincides with the road surface. A road model is represented by dividing a lane of the vehicle on the road into a plurality of sections in the distance direction and approximating as predetermined and connecting left and right lane lines in the sections. Note that, in this example, the shape of the lane is recognized on the basis of images from the pair of CCD cameras. Alternatively, besides, the shape of the lane may be calculated on the basis of image information from a monocular eye camera or a color camera.

The cant angle detection sensor 35 calculates the cant angle $\theta ca$ according to, for instance, the following Expression (1):

$$\theta ca = \sin^{-1}((G'-G)/g) \quad (1),$$

where, G represents a lateral acceleration value detected by a lateral acceleration sensor (not illustrated in the figure), G' represents a calculated lateral acceleration value calculated by, for instance, the following Expression (2), and g represents gravitational acceleration:

$$G' = (1/(1+As \cdot V^2)) \cdot (V^2/Lw) \cdot \theta p \quad (2),$$

where, As represents a stability factor peculiar to the vehicle and Lw represents a wheelbase.

Note that the cant angle $\theta ca$ may be obtained from, for instance, map information of a not-illustrated navigation system.

The steering controller 20 calculates a vehicle position in the width direction of a lane (a lane width direction vehicle lateral position) xv on the basis of the lane marking position information and sensor signals, calculates a yaw angle $\theta yaw$ of the vehicle with respect to the lane, calculates, on the basis of the lane width direction vehicle lateral position xv, the yaw angle $\theta yaw$, and the vehicle speed V, a lane deviation predicted time Tttlc in which the vehicle deviates from the lane, calculates, on the basis of the yaw angle $\theta yaw$ and the lane deviation predicted time Tttlc, a target yaw rate $\gamma t$ for preventing deviation from the lane, calculates, on the basis of the target yaw rate $\gamma t$ and an actual yaw rate $\gamma$, a target yaw moment Mzt serving as a target turning amount applied to the vehicle necessary for preventing deviation from the lane, observes a change rate dMzt/dt of the target yaw moment, when the change rate dMzt/dt of the target yaw moment is equal to or larger than a threshold $\Delta Mztc$ set in advance, calculates a target yaw moment Mzt(i) of this time by limiting the change rate dMzt/dt of the target yaw moment to be equal to or smaller than a change rate limit value Orate variably set according to at least traveling road information, calculates a target torque Tp on the basis of the target yaw moment Mzt(i) of this time, and outputs the target torque Tp to the motor driver 21. The lane deviation predicted time Tttlc is output to the warning control device 40 as well. The warning control device 40 compares the lane deviation predicted time Tttlc and a threshold set in advance. When the lane deviation predicted time Tttlc is shorter than the threshold, the warning control device 40 emits a lane deviation warning to the driver using an auditory warning such as sound or chime sound or a visual warning such as monitor display. In this way, the steering controller 20 serves as the deviation predictor, the target turning amount calculator, the target yaw moment calculator, and the target turning amount change rate limiter of the invention in this implementation.

Figure 2:
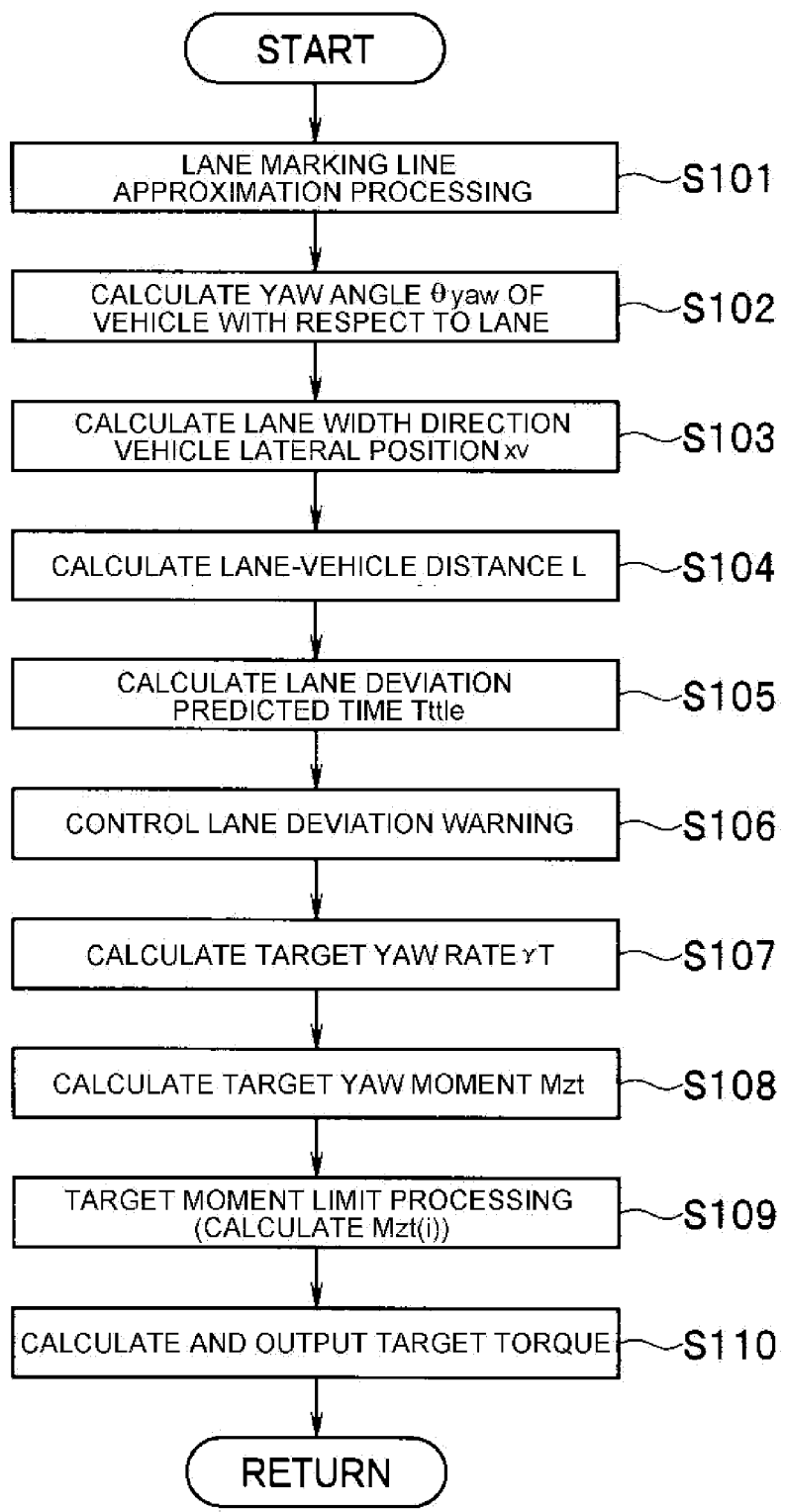
FIG. 2 is a flowchart of a lane deviation prevention control program according to the example of the present invention.

Lane deviation prevention control executed by the steering controller 20 is described below with reference to a flowchart of FIG. 2.

First, in step (hereinafter abbreviated as "S") 101, the steering controller 20 executes approximation processing for the left and right lane lines acquired by the forward recognition device 31.

The lane line on the left side of the vehicle is approximated by the following Expression (3) according to a method of least squares:

$$x = AL \cdot z^2 + BL \cdot z + CL \qquad (3)$$

The lane line on the right side of the vehicle is approximated by the following Expression (4) according to the method of least squares:

$$x = AR \cdot z^2 + BR \cdot z + CR \qquad (4)$$

"AL" and "AR" in Expression (3) and Expression (4) respectively indicate curvatures in curves of the lane lines. A curvature κ of the lane line on the left side is 2·AL. The curvature κ of the lane line on the right side is 2·AR. "BL" and "BR" in Expression (3) and Expression (4) respectively indicate tilts of the curves in the width direction of the vehicle. "CL" and "CR" respectively indicate positions of the curves in the width direction of the vehicle (see FIG. 4).

Subsequently, the steering controller 20 proceeds to S102 and calculates the lane yaw angle θyaw of the vehicle with respect to the lane according to the following Expression (5):

$$\theta yaw = (BL + BR)/2 \qquad (5)$$

Subsequently, the steering controller 20 proceeds to S103 and calculates the lane width direction vehicle lateral position xv, which is a vehicle position from the center of the lane, according to the following Expression (6):

$$xv = (CL + CR)/2 \qquad (6)$$

Subsequently, the steering controller 20 proceeds to S104 and calculates a lane-vehicle distance L according to the following Expression (7):

$$L = ((CL - CR) - TR)/2 - xv \qquad (7),$$

where, TR represents a tread of the vehicle. In the example of the present invention, a tire position is used as a reference for lane deviation determination.

Subsequently, the steering controller 20 proceeds to S105 and calculates the lane deviation predicted time Tttlc, in which the vehicle deviates from the lane, according to, for instance, the following Expression (8):

$$Tttlc = L/(V \cdot \sin(\theta yaw)) \qquad (8)$$

The steering controller 20 proceeds to S106 and outputs the lane deviation predicted time Tttlc to the warning control device 40. The warning control device 40 compares the lane deviation predicted time Tttlc and the threshold set in advance. When the lane deviation predicted time Tttlc is shorter than the threshold, the warning control device 40 emits a lane deviation warning to the driver using an auditory warning such as sound or chime sound or a visual warning such as monitor display.

Subsequently, the steering controller 20 proceeds to S107 and calculates the target yaw rate γt for preventing deviation from the lane according to the following Expression (9):

$$\gamma t = -\theta yaw/Tttlc \qquad (9)$$

Subsequently, the steering controller 20 proceeds to S108 and calculates, on the basis of the target yaw rate γt calculated in S107, the target yaw moment Mzt serving as a target turning amount applied to the vehicle necessary for preventing deviation from the lane according to the following Expression (10):

$$Mzt = Kp \cdot (\gamma t - \gamma) + Ki \cdot \int (\gamma t - \gamma) dt + Kd \cdot d(\gamma t - \gamma)/dt \qquad (10),$$

where, Kp represents a proportional gain, Ki represents an integral gain, and Kd represents a differential gain.

Figure 3:
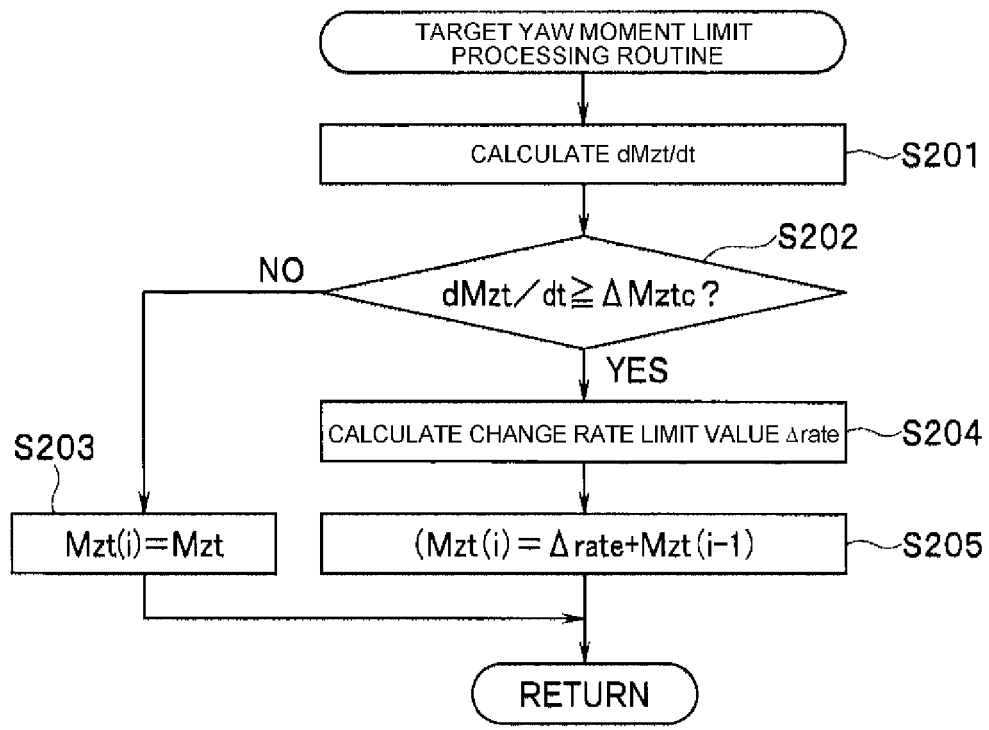
FIG. 3 is a flowchart of a target yaw moment control processing routine according to the example of the present invention.

Subsequently, the steering controller 20 proceeds to S109, performs target yaw moment limitation processing described in a flowchart of FIG. 3 described below and calculates the target yaw moment Mzt(i) of this time.

The steering controller 20 proceeds to S110, calculates the target torque Tp according to the following Expression (11) and outputs the target torque Tp to the motor driver 21:

$$Tp = K \cdot Mzt(i) \qquad (11),$$

where, K is a torque conversion gain set in advance.

The target yaw moment limitation processing executed in S109 is described with reference to a flowchart of FIG. 3.

First, in S201, the steering controller 20 calculates a change rate (a time differential value) dMzt/dt of the target yaw moment.

Subsequently, the steering controller 20 proceeds to S202, compares the change rate dMzt/dt of the target moment and the threshold ΔMztc set in advance. When the change rate dMzt/dt of the target yaw moment is smaller than the threshold ΔMztc (dMzt/dt<ΔMztc), the steering controller 20 determines that, even if the target yaw moment Mzt is directly applied to the vehicle, vehicle behavior does not greatly fluctuate and lane deviation can be reliably prevented. The steering controller 20 proceeds to S203, sets the target yaw moment Mzt in the target yaw moment Mzt(i) of this time, and leaves the routine.

Conversely, when the change rate dMzt/dt of the target yaw moment is equal to or larger than the threshold ΔMztc (dMzt/dt≥ΔMztc), the steering controller 20 determines that, if the target yaw moment is output without changing the change rate, it is likely that large fluctuation of the vehicle behavior is caused and lane deviation prevention cannot be reliably performed. The steering controller 20 proceeds to S204 and calculates the change rate limit value Δrate. The change rate limit value Δrate is calculated by, for instance, the following Expression (12):

$$\Delta rate = Gv \cdot G\kappa \cdot Gca \cdot Gw \cdot \Delta rate0 \qquad (12),$$

where, Δrate0 represents a change rate reference value set in advance by an experiment, an arithmetic operation, or the like.

Gv represents a vehicle speed sensitivity gain, Gκ represents a curvature sensitivity gain, Gca represents a cant sensitivity gain, and Gw represents a lane width sensitivity gain. The gains Gv, Gκ, Gca, and Gw are set by reading from a characteristic map set in advance by an experiment, an arithmetic operation, or the like. Characteristics of the gains Gv, Gκ, Gca, and Gw are described below.

Figure 5:
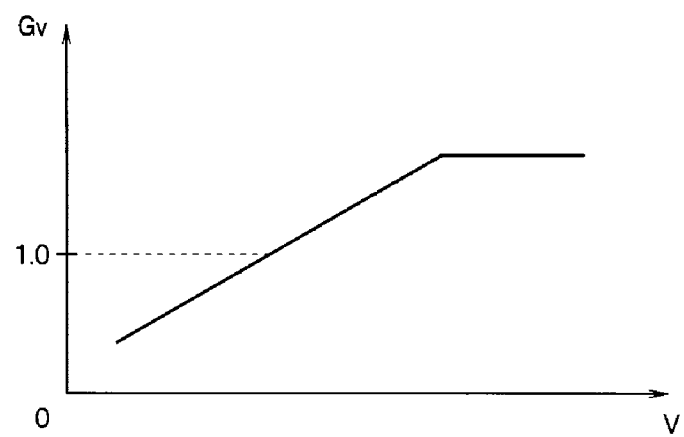
FIG. 5 is an explanatory diagram illustrating an instance of a characteristic of a vehicle speed sensitivity gain according to the example of the present invention.

As the characteristic of the vehicle speed sensitivity gain Gv, for instance, as illustrated in FIG. 5, the vehicle speed sensitivity gain Gv is set to a higher value as the vehicle speed V is higher. This is for the purpose of allowing early steering with respect to self-aligning torque that increases even if the vehicle speed V increases and reliably attaining prevention of deviation from the lane while suppressing large fluctuation of the vehicle behavior.

Figure 6A:
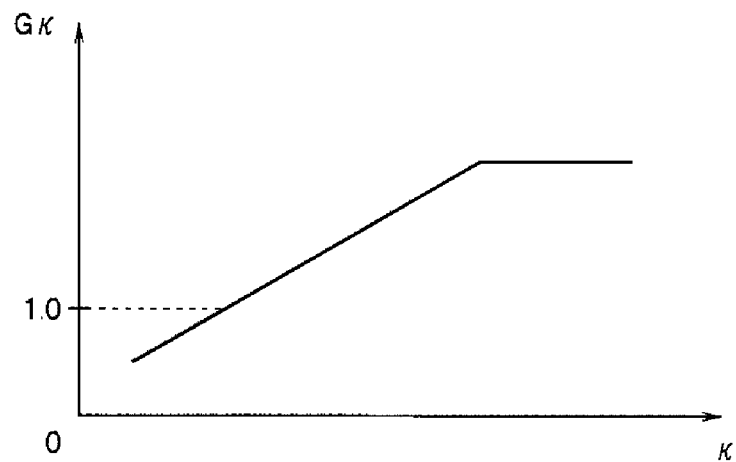
FIGS. 6A and 6B illustrate instances of characteristics of a curvature speed sensitivity gain according to the example of the present invention.
Figure 6B:
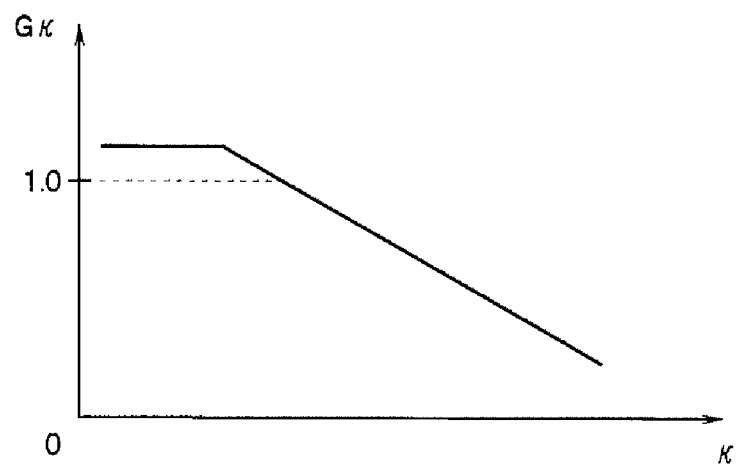
Figure 9:
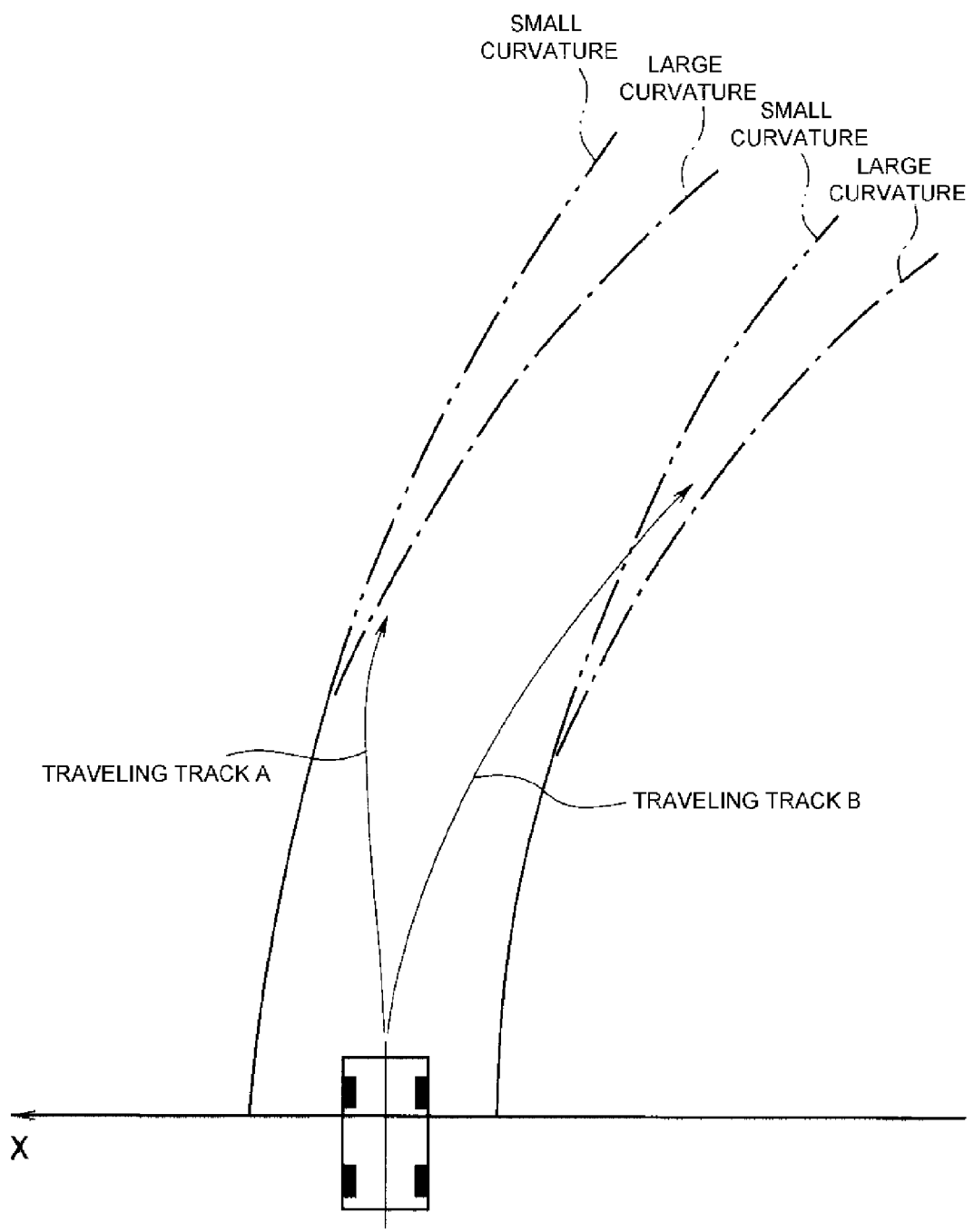
FIG. 9 is an explanatory diagram of FIG. 6 according to the example of the present invention.

As the characteristic of the curvature sensitivity gain Gκ, for instance, as illustrated in FIGS. 6A and 6B, the curvature sensitivity gain Gκ is separately set for deviation to the outer side of the curve (see FIG. 6A) and deviation to the inner side of the curve (see FIG. 6B). That is, as indicated by a traveling track A illustrated in FIG. 9, when the vehicle deviates to the outer side of the curve, in a lane having a large curvature κ (=(2·AL+2·AR)/2), a large target yaw moment Mzt is necessary to travel not to deviate from the lane having the large curvature κ. To make it possible to reliably execute application of the target yaw moment Mzt to the vehicle, as illustrated in FIG. 6A, the curvature sensitivity gain Gκ is set to a larger value as the curvature κ has a larger value. Conversely, as indicated by a traveling track B illustrated in FIG. 9, when the vehicle deviates to the inner side of the curve, in the lane having the large curvature κ, smooth control is performed when the vehicle travels at the target yaw moment Mzt smaller than the target yaw moment Mzt applied to the vehicle when control is performed along the curvature κ of the lane. A sense of discomfort given to the driver is small and stable control can be performed. Therefore, as illustrated in FIG. 6B, the curvature sensitivity gain Gκ is set to a smaller value as the curvature κ has a larger value.

Figure 7A:
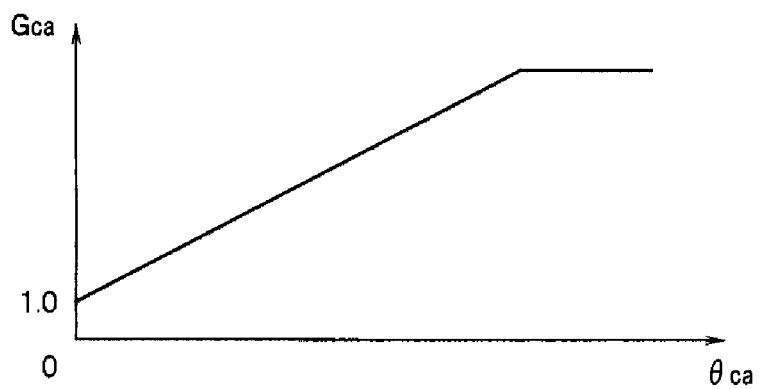
FIGS. 7A and 7B illustrate instances of characteristics of a cant sensitivity gain according to the example of the present invention.
Figure 7B:
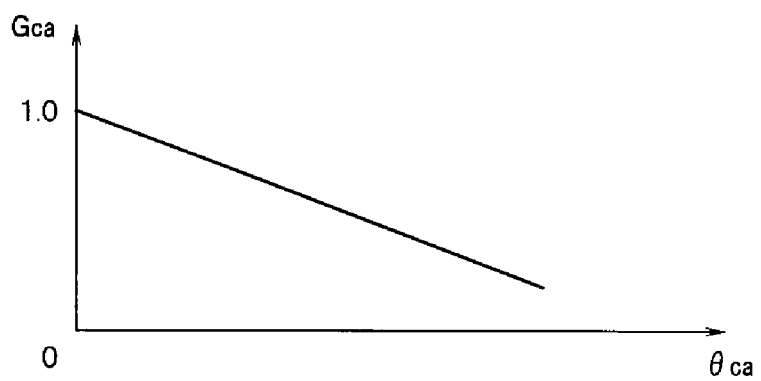
Figure 10:
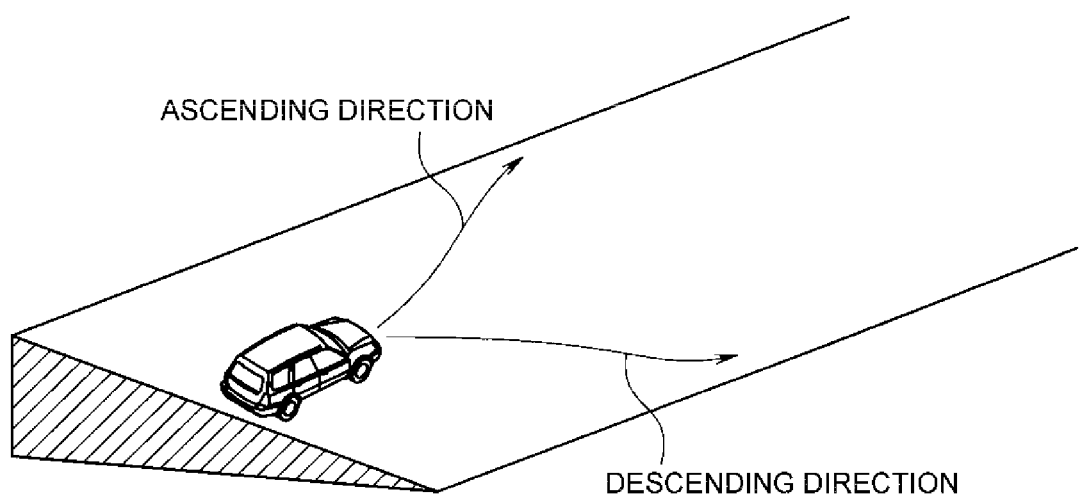
FIG. 10 is an explanatory diagram of FIG. 7 according to the example of the present invention.

Further, as the characteristic of the cant sensitivity gain Gca, for instance, as illustrated in FIGS. 7A and 7B, the cant sensitivity gain Ga is set separately for descending traveling of the vehicle on the cant (see FIG. 7A) and for ascending traveling of the vehicle on the cant (see FIG. 7B). That is, as indicated by a track in a descending direction illustrated in FIG. 10, when the vehicle descends and travels on the cant, a force generated by the cant of a road surface acts on a vehicle body in a direction opposite to the direction of the target moment Mzt that acts to prevent the vehicle from deviating from the lane. To make it possible to offset the force generated by the cant of the road surface and reliably prevent deviation from the lane, as illustrated in FIG. 7A, the cant sensitivity gain Gca is set to be a large value as the cant angle θca increases. Conversely, as indicated by a track in an ascending direction illustrated in FIG. 10, when the vehicle ascends and travels on the cant, a force generated by the cant of the road surface acts on the vehicle body in a direction same as the direction of the target yaw moment Mzt that acts to prevent the vehicle from deviating from the lane. Therefore, if the force generated by the cant of the road surface is applied in the direction same as the direction of the target yaw moment Mzt, it is likely that abrupt control is performed and a sense of discomfort is given to the driver. Therefore, as illustrated in FIG. 7B, the cant sensitivity gain Gca is set to be a smaller value as the cant angle θca is larger.

Figure 8:
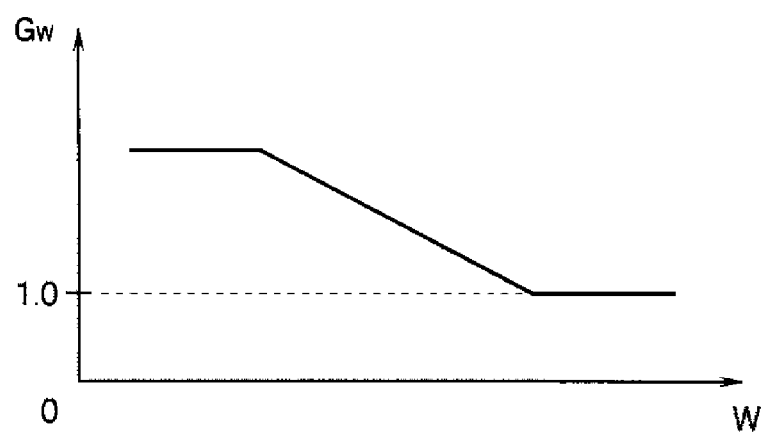
FIG. 8 is an explanatory diagram illustrating an instance of a characteristic of a lane width sensitivity gain according to the example of the present invention.

As illustrated in FIG. 8, the lane width sensitivity gain Gw is set to be a smaller value as the lane width W (CL-CR) is larger. This is for the purpose of limiting the change rate of the target yaw moment Mzt to be smaller as the lane width W is larger and making it possible to perform gentle and stable traveling in a wide lane. Conversely, this is for the purpose of setting the change rate of the target yaw moment Mzt to be larger as lane width is smaller to allow abrupt steering in a narrow lane and making it possible to perform sure lane deviation control.

The steering controller 20 proceeds to S204. After calculating the change rate limit value Δrate, the steering controller 20 proceeds to S205, sets the target yaw moment Mzt(i) of this time according to, for instance, the following Expression (13), and leaves the routine:

$$Mzt(i)=\Delta rate+Mzt(i-1) \qquad (13),$$

where, Mzt(i−1) represents a memorized target yaw moment of the last time.

As described above, according to this example, the steering controller 20 calculates the lane width direction vehicle lateral position xv, calculates the yaw angle θyaw of the vehicle with respect to the lane, calculates, on the basis of the lane width direction vehicle lateral position xv, the yaw angle θyaw, and the vehicle speed V, the lane deviation predicted time Tttlc in which the vehicle deviates from the lane, calculates, on the basis of the yaw angle θyaw and the lane deviation predicted time Tttlc, the target yaw rate γt for preventing deviation from the lane, calculates, on the basis of the target yaw rate γt and then actual yaw rate γ, the target yaw moment Mzt applied to the vehicle necessary for preventing deviation from the lane, observes the change rate dMzt/dt of the target yaw moment, when the change rate dMzt/dt of the target yaw moment is equal to or larger than the threshold ΔMztc set in advance, calculates the target yaw moment Mzt(i) by limiting the change rate dMzt/dt of the target yaw moment to be equal to or smaller than the change rate limit value Δrate variably set according to at least the traveling road information and outputs the change rate dMzt/dt, calculates the target torque Tp on the basis of the target yaw moment Mzt(i) of this time, and outputs the target torque Tp to the motor driver 21. Therefore, the change rate dMzt/dt of the target moment Mzt set by the lane deviation prevention control is limited to be equal to or lower than the change rate limit value Δrate calculated according to the deviation direction in the curve, the lane curvature κ, the cant of the lane, the lane width W, and the like serving as the traveling road information. Therefore, fluctuation in the vehicle behavior caused by the lane deviation control is suppressed and a sense of discomfort is not given to the driver. Consequently, it is possible to reliably prevent deviation from the lane.

In this example, the change rate limit value Δrate is set using the three kinds of information, i.e., the deviation direction in the curve, the lane curvature κ, the cant of the lane, and the lane width W as the traveling road information. Alternatively, the setting of the change rate limit value Δrate is not limited to this. The change rate limit value Δrate may be set according to any one or any two of these kinds of information.

The invention claimed is:

1. A lane deviation prevention control apparatus of a vehicle comprising:
   a lane detector that detects a lane in which the vehicle is traveling;
   a deviation predictor that predicts deviation from the lane on the basis of position information and a traveling state of the vehicle in the lane;
   a target turning amount calculator that calculates, on the basis of the prediction of deviation from the lane, a target turning amount to be applied to the vehicle, the target turning amount being necessary for preventing the deviation from the lane;
a target yaw moment calculator that generates a target yaw moment in the vehicle to follow the target turning amount;
a target turning amount change rate limiter that observes a change rate of the target yaw moment, limits, when the change rate of the target yaw moment exceeds a threshold set in advance, a change rate of the target turning amount with at least a change rate limiting value variably set according to information on the lane in which the vehicle is traveling, and outputs the target yaw moment adjusted based on the limited change rate; and
an electric motor that applies torque to a steering wheel of the vehicle based on the target yaw moment, wherein
the change rate limit value is variably set according to at least vehicle speed of the vehicle, and
the change rate limit value increases as the vehicle speed increases.

2. The lane deviation prevention control apparatus of a vehicle according to claim 1, wherein
the change rate limit value is variably set according to at least a deviation direction in a curve of the lane and a lane curvature, and
when the vehicle deviates to an outer side of the curve of the lane, the change rate limit value is set to a larger value as the lane curvature increases, and when the vehicle deviates to an inner side of the curve of the lane, the change rate limit value is set to a smaller value as the lane curvature increases.

3. The lane deviation prevention control apparatus of a vehicle according to claim 1, wherein
the change rate limit value is variably set according to at least a deviation direction in a curve of the lane and a lane curvature, and
when the vehicle deviates to an outer side of the curve of the lane, the change rate limit value is set to a larger value as the lane curvature increases, and when the vehicle deviates to an inner side of the curve of the lane, the change rate limit value is set to a smaller value as the lane curvature increases.

4. The lane deviation prevention control apparatus of a vehicle according to claim 1, wherein
the change rate limit value is variably set according to at least a cant of the lane, and
when the vehicle deviates in a descending direction of the cant, the change rate limit value is set to a larger value as the cant increases, and when the vehicle deviates in an ascending direction of the cant, the change rate limit value is set to a smaller value as the cant increases.

5. The lane deviation prevention control apparatus of a vehicle according to claim 1, wherein
the change rate limit value is variably set according to at least a cant of the lane, and
when the vehicle deviates in a descending direction of the cant, the change rate limit value is set to a larger value as the cant increases, and when the vehicle deviates in an ascending direction of the cant, the change rate limit value is set to a smaller value as the cant increases.

6. The lane deviation prevention control apparatus of a vehicle according to claim 2, wherein
the change rate limit value is variably set according to at least a cant of the lane, and
when the vehicle deviates in a descending direction of the cant, the change rate limit value is set to a larger value as the cant increases, and when the vehicle deviates in an ascending direction of the cant, the change rate limit value is set to a smaller value as the cant increases.

7. The lane deviation prevention control apparatus of a vehicle according to claim 3, wherein
the change rate limit value is variably set according to at least a cant of the lane, and
when the vehicle deviates in a descending direction of the cant, the change rate limit value is set to a larger value as the cant increases, and when the vehicle deviates in an ascending direction of the cant, the change rate limit value is set to a smaller value as the cant increases.

8. The lane deviation prevention control apparatus of a vehicle according to claim 1, wherein
the change rate limit value is variably set according to at least a lane width, and the change rate limit value is set to a smaller value as the lane width is larger.

9. The lane deviation prevention control apparatus of a vehicle according to claim 1, wherein
the change rate limit value is variably set according to at least a lane width, and the change rate limit value is set to a smaller value as the lane width is larger.

10. The lane deviation prevention control apparatus of a vehicle according to claim 2, wherein
the change rate limit value is variably set according to at least a lane width, and the change rate limit value is set to a smaller value as the lane width is larger.

11. The lane deviation prevention control apparatus of a vehicle according to claim 3, wherein
the change rate limit value is variably set according to at least a lane width, and the change rate limit value is set to a smaller value as the lane width is larger.

12. The lane deviation prevention control apparatus of a vehicle according to claim 4, wherein
the change rate limit value is variably set according to at least a lane width, and the change rate limit value is set to a smaller value as the lane width is larger.

13. The lane deviation prevention control apparatus of a vehicle according to claim 5, wherein
the change rate limit value is variably set according to at least a lane width, and the change rate limit value is set to a smaller value as the lane width is larger.

14. The lane deviation prevention control apparatus of a vehicle according to claim 6, wherein
the change rate limit value is variably set according to at least a lane width, and the change rate limit value is set to a smaller value as the lane width is larger.

15. The lane deviation prevention control apparatus of a vehicle according to claim 7, wherein
the change rate limit value is variably set according to at least a lane width, and the change rate limit value is set to a smaller value as the lane width is larger.

* * * * *